(12) United States Patent
Song et al.

(10) Patent No.: US 10,987,635 B2
(45) Date of Patent: Apr. 27, 2021

(54) CERAMIC MEMBRANE FOR WATER TREATMENT USING OXIDATION-TREATED SIC AND METHOD FOR MANUFACTURING THE SAME

(71) Applicant: KOREA INSTITUTE OF MACHINERY & MATERIALS, Daejeon (KR)

(72) Inventors: In-Hyuck Song, Changwon-si (KR); Jong-Man Lee, Changwon-si (KR); Jang-Hoon Ha, Changwon-si (KR); Syed Zaighum Abbas Bukhari, Changwon-si (KR)

(73) Assignee: KOREA INSTITUTE OF MATERIALS SCIENCE, Changwun-si (KR)

( * ) Notice: Subject to any disclaimer, the term of this patent is extended or adjusted under 35 U.S.C. 154(b) by 68 days.

(21) Appl. No.: 15/820,952

(22) Filed: Nov. 22, 2017

(65) Prior Publication Data
US 2018/0169588 A1   Jun. 21, 2018

(30) Foreign Application Priority Data
Dec. 20, 2016   (KR) ........................ 10-2016-0174618

(51) Int. Cl.
  *B01D 67/00*   (2006.01)
  *B01D 69/02*   (2006.01)
  (Continued)

(52) U.S. Cl.
  CPC ..... *B01D 67/0041* (2013.01); *B01D 67/0044* (2013.01); *B01D 67/0046* (2013.01);
  (Continued)

(58) Field of Classification Search
None
See application file for complete search history.

(56) References Cited

U.S. PATENT DOCUMENTS

2012/0186240 A1* 7/2012 Tanaka ................. F01N 3/0222
60/311

FOREIGN PATENT DOCUMENTS

| CN | 102574039 | 7/2012 |
|----|-----------|--------|
| CN | 104174298 | 12/2014 |

(Continued)

OTHER PUBLICATIONS

J. Roy et al., "Oxidation Behaviour of Silicon Carbide—A Review", Rev.Adv.Mater.Sci.38, pp. 29-39, 2014.

(Continued)

*Primary Examiner* — Jason M Greene
*Assistant Examiner* — Eric J McCullough
(74) *Attorney, Agent, or Firm* — Lex IP Meister, PLLC

(57) ABSTRACT

Disclosed are a ceramic membrane for water treatment using oxidation-treated SiC and a method for manufacturing the same. An object of the present invention is to manufacture a ceramic membrane for water treatment, which can be sintered at a low temperature of 1,050° C. or less, in which a SiO₂ oxide layer formed during an oxidation process induces volume expansion so as to prevent defects due to the contraction of a coating layer during general sintering. The ceramic membrane for water treatment using the oxidation treated SiC includes a porous ceramic support layer; and a SiC layer formed on the porous ceramic support layer and including SiC particles on which a SiO₂ oxide layer formed on a surface thereof.

8 Claims, 13 Drawing Sheets

(a)

(b)

(51) Int. Cl.
    *B01D 69/12*     (2006.01)
    *B01D 71/02*     (2006.01)
    *C02F 1/44*     (2006.01)
    *C04B 41/87*     (2006.01)
    *C04B 38/00*     (2006.01)
    *C04B 111/00*     (2006.01)

(52) U.S. Cl.
    CPC ............ *B01D 69/02* (2013.01); *B01D 69/12* (2013.01); *B01D 71/021* (2013.01); *B01D 71/027* (2013.01); *C02F 1/44* (2013.01); *C04B 38/0054* (2013.01); *C04B 41/87* (2013.01); *C04B 2111/00612* (2013.01); *C04B 2111/00801* (2013.01)

(56) References Cited

FOREIGN PATENT DOCUMENTS

| | | |
|---|---|---|
| EP | 0219383 | 4/1987 |
| EP | 2219383 | 8/2010 |
| JP | 2600105 | 4/1997 |
| JP | 2003-103285 | 4/2003 |
| WO | 2011/040554 | 4/2011 |
| WO | 2011/040561 | 4/2011 |
| WO | 2011/040563 | 4/2011 |

OTHER PUBLICATIONS

J. H. She et al., "Oxidation bonding of porous silicon carbide ceramics", Journal of Materials Science 37, pp. 3615-3622, 2002.
JPO, Office Action of JP 2017-226022 dated Oct. 23, 2018.
SIPO, Office Action of CN 201711194071.X dated Apr. 26, 2020.

* cited by examiner (a)

(b)

(a)

(b)

(a)

(b)

(a)

(b)

CERAMIC MEMBRANE FOR WATER TREATMENT USING OXIDATION-TREATED SIC AND METHOD FOR MANUFACTURING THE SAME

CROSS-REFERENCE TO RELATED APPLICATION

This application claims priority to and the benefit of Korean Patent Application No. 10-2016-0174618, filed on Dec. 20, 2016, the disclosure of which is incorporated herein by reference in its entirety.

BACKGROUND

1. Field of the Invention

The present invention relates to a ceramic membrane for water treatment, and more specifically, to a ceramic membrane for water treatment using a $SiO_2$ oxide layer formed on a surface of silicon carbide (SiC) powder and a method for manufacturing the same.

2. Discussion of Related Art

Porous ceramics are actively studied in various fields due to their unique characteristics such as low density, low thermal conductivity, and a low dielectric constant. In particular, membranes formed by porous ceramics have various industrial application fields such as purification of medicines or foodstuffs, filtration of waste gas, and the like, and among these, a representative example is the use of membranes for water purification. Industrially, polymer membranes are widely used, but polymer membranes have disadvantages including low mechanical strength, reduced chemical stability, and low temperature resistance.

On the other hand, porous ceramic membranes have excellent acid resistance compared to polymer membranes, and have excellent high temperature stability so that porous ceramic membranes can be used in more severe conditions than polymer membranes, for example, in applications such as the separation and purification of strong acidic or alkaline solutions containing an organic solvent, oil, or the like, and it has an advantage that it can be used even at high temperature. In addition, porous ceramic membranes have superior biological resistance compared to polymer membranes, and thus have an advantage of excellent durability.

Ceramic membranes for water treatment that are composed of generally commercialized alumina materials are positively (+) charged on their surface, and for organic substances that are negatively (−) charged, accelerated contamination by fouling is triggered. Therefore, it is necessary to make improvements for an excellent flow rate and contamination resistance, and for this reason, novel ceramic membranes whose surface can be negatively charged are in fact necessary.

Meanwhile, silicon carbide (SiC)-type membranes are negatively (−) charged on their surface and induce repulsion with respect to organic matter that is negatively (−) charged, thereby capable of improving the accelerated contamination by fouling.

However, since such SiC materials have a very high sintering temperature of 1800° C. or greater, it is not easy to manufacture the SiC materials, and commercialization is difficult, and thus, it is necessary to manufacture economically feasible membranes through the development of a low temperature sintering process.

In order to lower the sintering temperature of existing silicon carbide-based membranes, many efforts were made to reduce the reaction temperature by including low melting point glass components and clay components at various mixing compositions, but there are limits to the manufacture of membranes whose reaction temperature can be lowered to 1,300° C. or less or which have excellent durability.

In related prior art literature, there is a paper by J. H. She, et al. (J. H. She, Z. Y. Deng, J. Daniel-Doni, and T. Ohji, Oxidation Bonding of Porous Silicon Carbide Ceramics, *J. Mater. Sci.* 37[17]3615-22 (2002)), and this paper relates to a technique for oxidatively sintering silicon carbide in a bulk state.

SUMMARY OF THE INVENTION

An object of the present invention is to provide a ceramic membrane for water treatment capable of being sintered at a low temperature of 1,050° C. or less.

Another object of the present invention is to provide a method for manufacturing the ceramic membrane for water treatment.

In order to achieve one of the above objects, the ceramic membrane for water treatment according to the present invention may include a porous ceramic support layer; and a SiC layer formed on the porous ceramic support layer and including SiC particles on which a $SiO_2$ oxide layer formed on a surface thereof.

The SiC particles may have an average particle diameter of 1 μm or less. The SiC layer may include pores having an average diameter in a range of 0.05 μm to 0.5 μm.

SiC oxidation (percentage) of the SiC particles may be in a range of 12% to 15%.

The $SiO_2$ oxide layer may have a thickness in a range of 0.028 μm to 0.035 μm. The SiC layer may be in the form of a film having a thickness in a range of 10 μm to 25 μm.

In order to achieve another one of the above objects, the method of manufacturing a ceramic membrane for water treatment according to the present invention may include steps of (a) coating a porous ceramic support layer with a slurry including SiC powder on; and (b) sintering the coated result at a temperature of 950° C. to 1,050° C.; by which a $SiO_2$ oxide layer is formed on a surface of SiC particles by the sintering.

The sintering may be carried out for 2 hours to 4 hours.

In step (b), a SiC layer may include pores having an average pore size in a range of 0.05 μm to 0.5 μm.

In step (b), a SiC layer may be in the form of a film having a thickness in a range of 10 μm to 25 μm.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
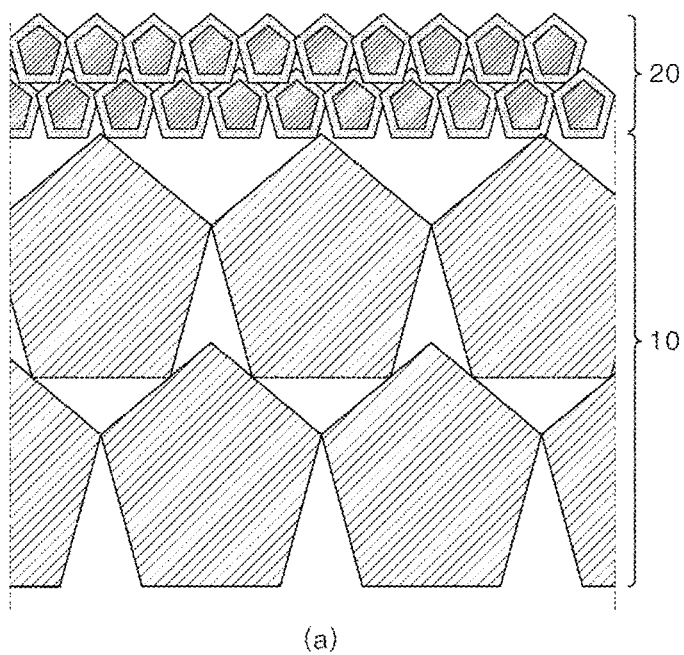
FIG. 1 includes (a) a schematic diagram illustrating a ceramic membrane for water treatment using oxidation-treated SiC according to the present invention and (b) a cross-sectional diagram illustrating a $SiO_2$ oxide layer formed on a surface of SiC particles.

The advantages and features of the present invention, and methods to achieve them will become apparent with reference to the exemplary embodiments which are described in detail below with the accompanying drawings. However, the present invention is not limited to the exemplary embodiments disclosed below and may be embodied in various different forms, and the exemplary embodiments merely complete the disclosure of the present invention. The present invention is provided to fully disclose the scope of the invention to a person having ordinary skill in the technical field to which the present invention belongs, and the present invention is only defined by the scope of the claims. Like reference numerals refer to like constituent elements throughout the entire specification.

Hereinafter, with reference to the accompanying drawings, the ceramic membrane for water treatment using oxidation-treated SiC and a method for manufacturing the same according to preferred exemplary embodiments of the present invention will be described in detail as follows.

The present invention relates to a ceramic membrane for water treatment using the binding of $SiO_2$ oxide layers formed on the surface of SiC particles by coating a support layer with SiC powder followed by sintering under an oxidizing environment or atmospheric environment, and a method for manufacturing the same. That is, the $SiO_2$ oxide layer formed during the oxidation process induces volume expansion, and ceramic membranes, in which defects due to the contraction of coating layers during general sintering can be prevented, can be manufactured.

FIG. 1 includes (a) a schematic diagram illustrating the ceramic membrane for water treatment using oxidation-treated SiC according to the present invention and (b) a cross-sectional diagram illustrating a $SiO_2$ oxide layer formed on a surface of SiC particles.

Referring to FIG. 1, the ceramic membrane for water treatment according to the present invention includes a porous ceramic support layer 10 and a SiC layer 20 formed on the porous ceramic support layer 10.

Porous Ceramic Support Layer 10

The porous ceramic support layer according to the present invention can be formed of a ceramic including one or more of silicon carbide (SiC), alumina ($Al_2O_3$), titanium dioxide ($TiO_2$), and zirconia ($ZrO_2$), and can have a porosity of 40% to 60%.

Pores included in the porous ceramic support layer 10 can have an average diameter of 1 μm to 3 μm, and can be pores whose average diameter is about 3 times greater than the average diameter of the pores contained in the SiC layer 20.

The pores included in the SiC layer 20 can have an interconnected pore structure in which a network structure is developed.

In general, pores can be classified into independent pores (closed cell) in which the walls of the pores are all closed, and continuous pores (opened cell) which has a structure in which a part of the walls of the pores is opened.

The pores according to the present invention are open pores, that is, continuous pores (opened cell), and a part among the walls of the pores is open such that the pores are interconnected with other pores. As such, since the porous ceramic support layer 10 includes interconnected pores having a diameter of 1 μm to 3 μm, interconnected pores are thus formed inside the porous ceramic support layer 10, and thereby an effect of excellent water permeance can be exhibited.

SiC Layer 20

The SiC layer 20 is formed on the porous ceramic support layer 10.

As shown in FIG. 1, the SiC layer 20 is a coating layer including SiC particles, and a $SiO_2$ oxide layer is formed on the surface of the SiC particles. This $SiO_2$ oxide layer induces volume expansion, which has an effect of being able to prevent defects due to the contraction of coating layers during general sintering.

Figure 2:
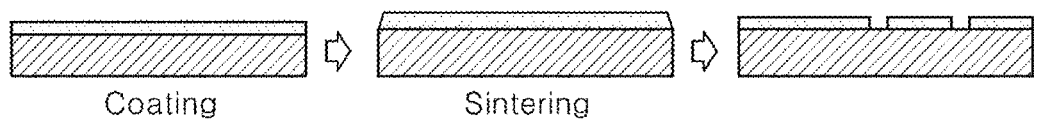
FIG. 2 is a cross-sectional diagram illustrating a ceramic membrane for water treatment showing a conventional coating and defects due to the contraction of a coating layer during sintering.
Figure 3:
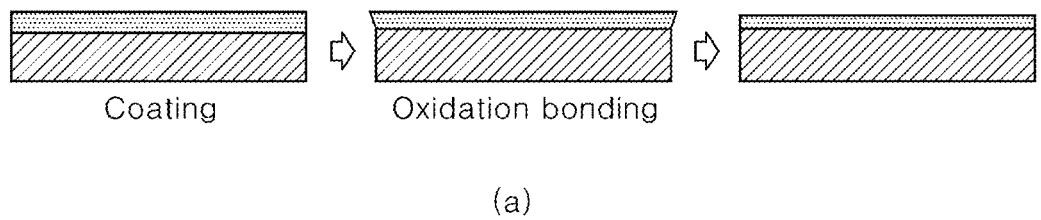
FIG. 3 includes (a) a cross-sectional diagram illustrating a ceramic membrane for water treatment due to coating and sintering according to the present invention and (b) an illustration of a rearrangement state of particles.
Figure 3:
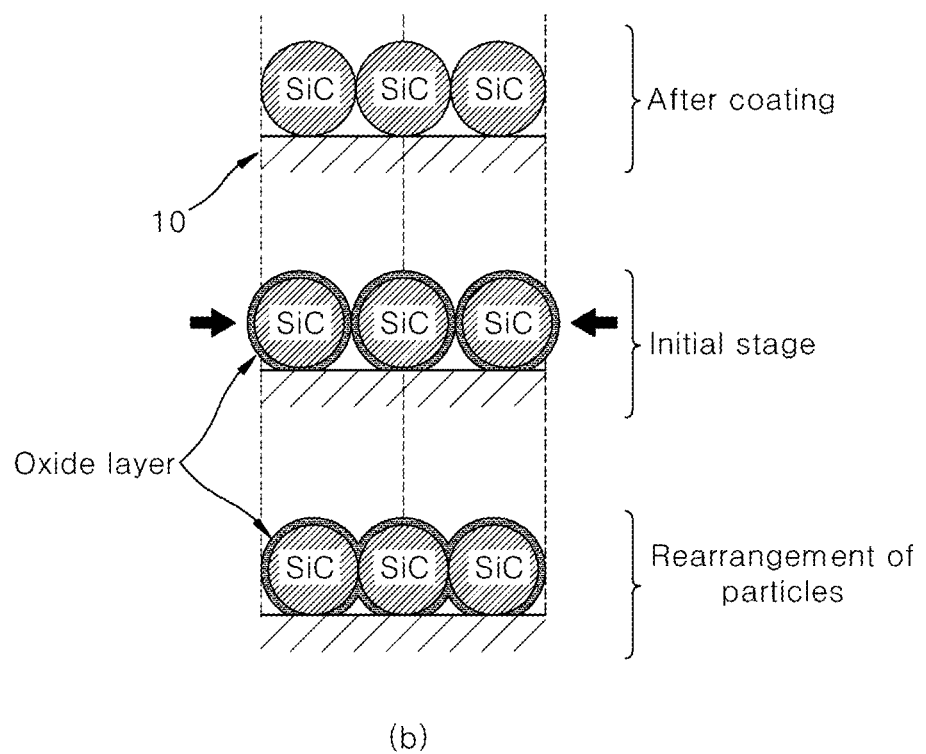

FIG. 2 is a cross-sectional diagram illustrating a ceramic membrane for water treatment showing a conventional coating and defects due to the contraction of a coating layer during sintering, and FIG. 3 includes (a) a cross-sectional diagram illustrating a ceramic membrane for water treatment due to coating and sintering according to the present invention and (b) an illustration of a rearrangement state of particles.

Referring to FIGS. 3(a) and 3(b), it can be confirmed that volume expansion occurs by the oxidation bonding of SiC. During oxidative sintering in air, a coating layer that expands at an initial stage tends to return to its original size. That is, the coating layer shows compressive stress. Such compressive stress helps to rearrange the particles and partly densify them without forming cracks. This phenomenon can be explained by a monolayer of particles on a sintered porous ceramic support body, which is schematically represented. An oxidative layer is formed on the surface of particles during sintering in air, and thereby the size of the particles increases, which causes the coating layer to expand. It can be seen that optimum compressive stress due to the oxidative expansion of powder in an oxidatively bonded SiC membrane has an important influence on the rearrangement of particles in the coating layer.

As such, the SiC layer linearly expands by of about 4% to 5% due to the oxidation process, but since the filling rate of the initial SiC layer is less than 60%, a slight expansion is rather an advantageous factor for manufacturing good membranes within the limit of being able to control the pore size of the SiC layer.

In addition, in the present invention, the sintering temperature can be lowered to 1,050° C. or less by including SiC particles formed by sintering SiC powder having an average particle diameter of 1 µm or less, whereas the sintering temperature of SiC in the existing bulk state is 1,800° C. That is, in the case of including SiC particles having an average particle diameter of 1 µm or less, oxygen supply is smoother than that of SiC in the existing bulk state, thereby the oxidation process operates effectively, and an effect of excellent durability can be exhibited.

In addition, the SiC layer 20 maintains the interconnected pores and can thereby provide an effect of excellent water permeability. The interconnected pores are, as previously described, interconnected pores in which a part of the walls of the pores open such that the pores are connected to other pores.

The average diameter of such pores can be 0.05 µm to 0.5 µm, and when the pores have an average diameter of less than 0.05 µm, the water permeance of the membrane can be reduced, because the diameter of pores is too small. Conversely, when it exceeds 0.5 µm, the size of pores increases and thus water permeance increases, but the separation effect decreases, and the application field is reduced as a result. There is a disadvantage in that an oxidative bonding step by heat treatment for 4 hours or more at a high temperature of 1,100° C. or more is required for strengthening oxidative bonding strength.

Figure 4:
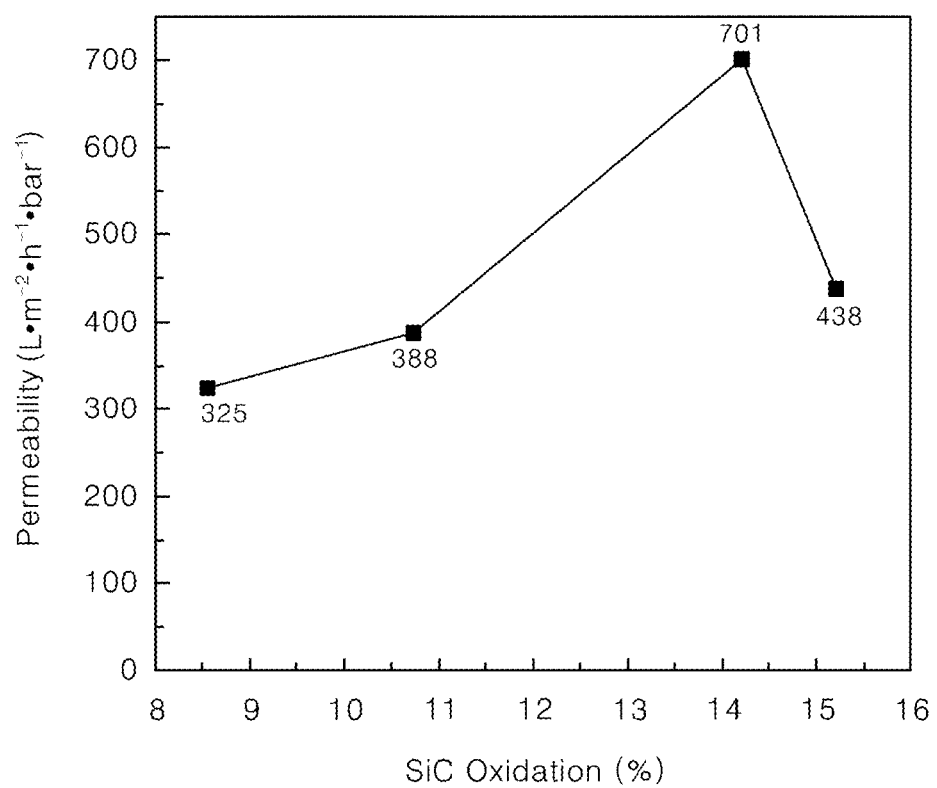
FIG. 4 is a graph showing the water permeance of a SiC layer according to SiC oxidation (percentage) of SiC particles.

FIG. 4 is a graph showing the water permeance of a SiC layer according to SiC oxidation (percentage) of SiC particles.

Referring to FIG. 4, the water permeance gradually increases in a 9% to 11% range of the SiC oxidation percentage, and it is observed that an increased gradient of the permeability rises sharply above 11% as compared with below 11%. Afterwards, when the SiC oxidation percentage is 14%, the permeability shows its maximum value.

Therefore, the increased gradient of permeability has an inflection point when the SiC oxidation percentage is approximately 12%.

Meanwhile, the permeability after 14% of the SiC oxidation percentage shows a sharply decreasing behavior similar to the previous changes in permeability below 14%.

Therefore, the decreased gradient of permeability has an inflection point when the SiC oxidation (percentage) is approximately 15%.

The degree of SiC oxidation of SiC particles, that is, the degree of conversion to $SiO_2$ can be theoretically determined according to the equation of Hoffmann, et al.

When SiC is completely oxidized to $SiO_2$, the total weight ($MSiO_2$) of the SiC layer will increase by 49.875% by weight with respect to the weight (MSiC) of the SiC layer when SiC is partially oxidized.

$$\text{Yield } (\%) = \{(MSiO_2 - MSiC)/MSiC\} \times 100 = 49.875\% \quad \text{[Equation 1]}$$

Based on this equation, the weight of the SiC layer when the SiC layer is completely oxidized relative to the weight of the SiC layer when the SiC is layer can be calculated to determine the SiC oxidation percentage (%) in Equation 3.

The weight change (Δm(sample) %) of the SiC oxidation percentage can be calculated using Equation 2 and Δm(sample) % can be approximately 6.5% to 7.5%.

In Equation 2, the sintered sample weight refers to SiC particles on which a $SiO_2$ oxide layer is formed, and the green sample weight refers to SiC particles without the $SiO_2$ oxide layer.

$$\Delta m(\text{sample}) \% = \frac{\text{Sintered sample weight} - \text{Green sample weight}}{\text{Green sample weight}} \times 100 \quad \text{[Equation 2]}$$

$$SiC \text{ Oxidation percentage} = \frac{\Delta m(\text{sample}) \%}{49.875\%} \times 100 \quad \text{[Equation 3]}$$

The SiC particles according to the present invention can have a SiC oxidation percentage of 12% to 15%, as shown in FIG. 4, and when it falls out of this range, it is confirmed that the water permeance is decreased.

Figure 5:
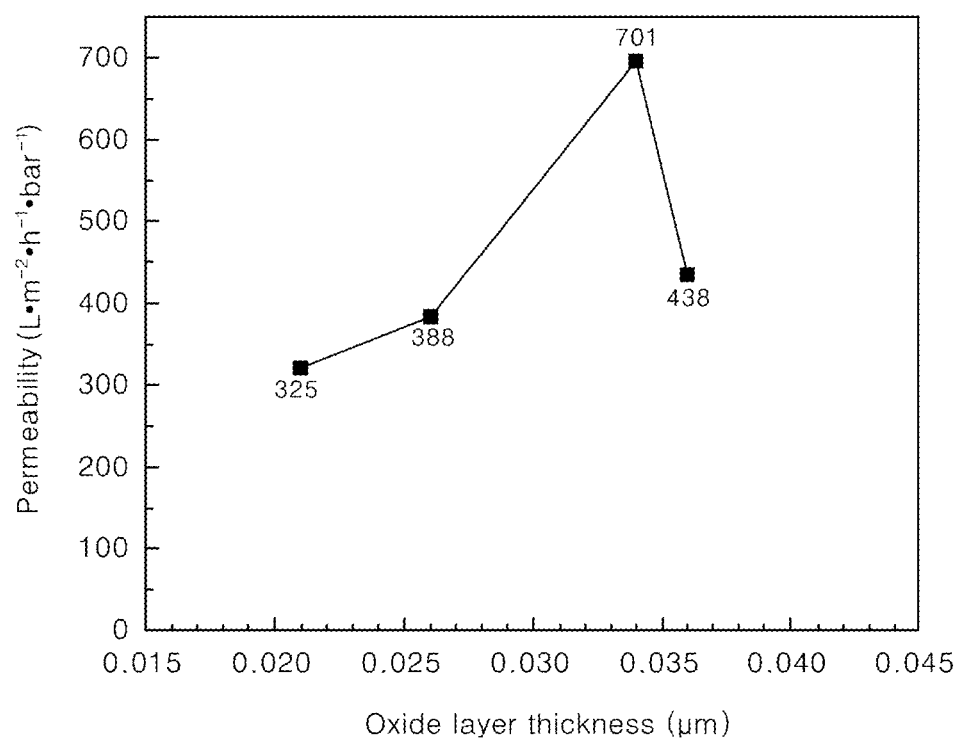
FIG. 5 is a graph showing the water permeance of a SiC layer according to thickness of a $SiO_2$ oxide layer formed on a surface of SiC particles.

FIG. 5 is a graph showing the water permeance of a SiC layer according to thickness of a $SiO_2$ oxide layer formed on a surface of SiC particles. As shown in FIG. 1(b) and FIG. 5, when the thickness (d) of the $SiO_2$ oxide layer formed on the surface of the SiC particles satisfies the range of 0.028 µm to 0.035 µm, an excellent water permeance of 400 $L \cdot m^{-2} \cdot h^{-1} \cdot bar^{-1}$ or higher can be exhibited.

Referring to FIG. 5, the permeance gradually increases when the thickness (d) of the oxide layer is in the range of 0.022 µm to 0.027 µm, and a phenomenon in which the increased gradient of the permeability sharply rises after 0.027 µm is observed. Afterwards, when the thickness (d) of the oxide layer is 0.034 µm, the permeability shows its maximum value.

Therefore, the increased gradient of permeability has an inflection point when the thickness (d) of the oxide layer is approximately 0.028 µm.

Meanwhile, when the thickness (d) of the oxide layer is greater than 0.034 µm, the permeability shows a sharply decreasing behavior similar to the changes in permeability before 0.034 µm.

Therefore, the decreased gradient of permeability has an inflection point when the thickness (d) of the oxide layer is approximately 0.035 µm.

Figure 6:
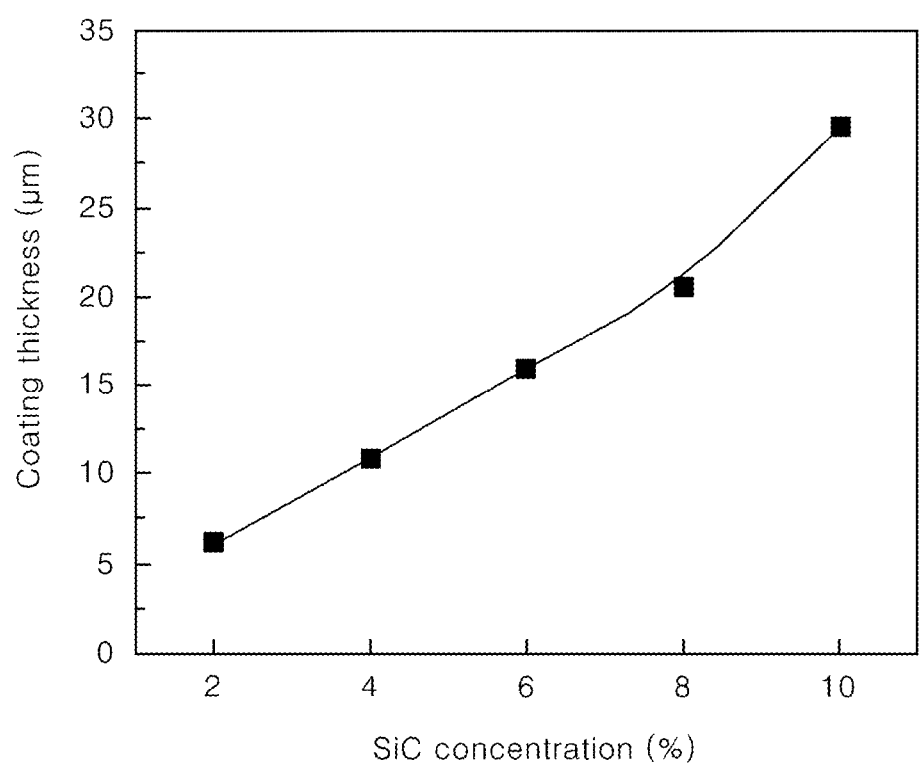
FIG. 6 is a graph showing the coating thickness of a SiC layer according to SiC concentration.

FIG. 6 is a graph showing the coating thickness of a SiC layer according to SiC concentration. Referring to FIG. 6, as the concentration of SiC powder increases, the area to which a slurry is attached increases due to high viscosity, and the thickness of the SiC layer thereby increases as a result. The SiC layer 20 containing about 2% by weight to 10% by weight of SiC powder can be formed in the form of a film having a thickness of 5 µm to 30 µm.

Figure 7:
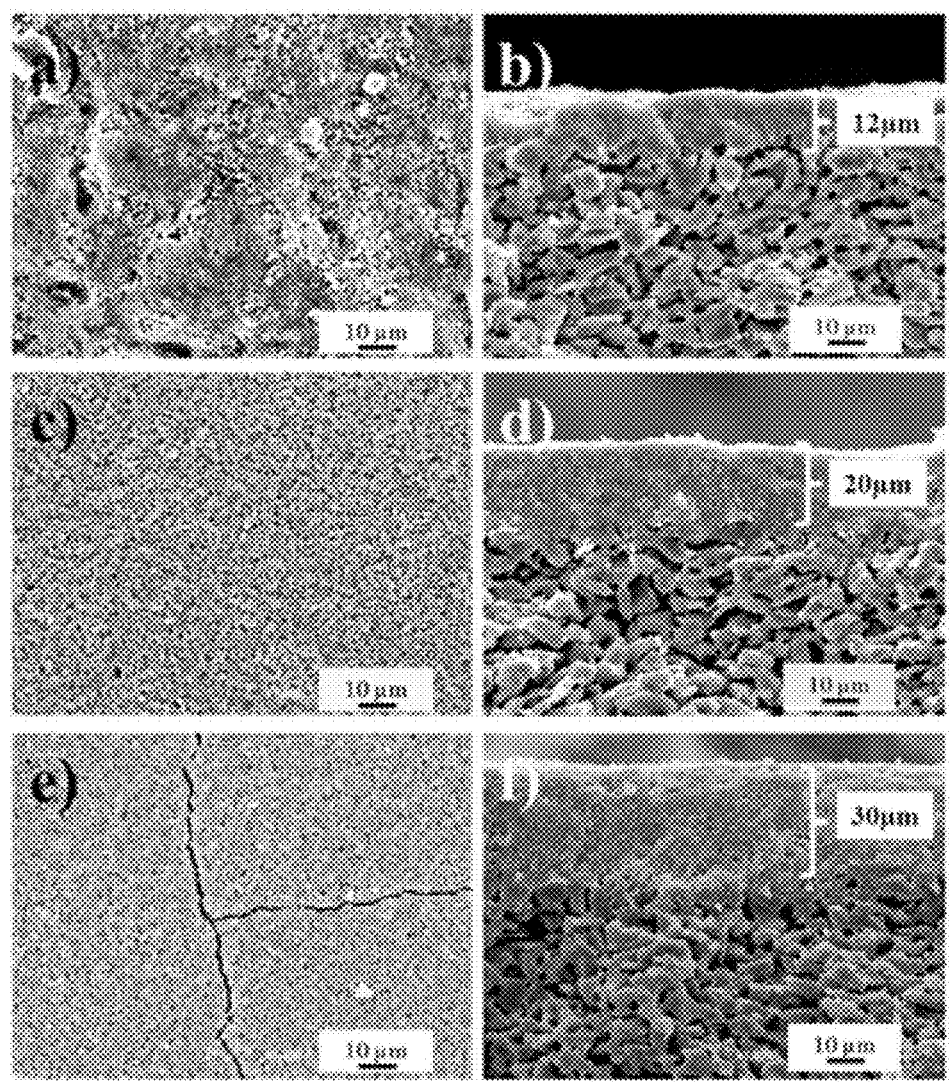
FIG. 7 includes SEM images of a porous ceramic support layer and a ceramic membrane for water treatment including a SiC layer, manufactured under a sintering condition at 1300° C. for 1 hour with varying contents of SiC powder.

FIG. 7 includes SEM images of a porous ceramic support layer and a ceramic membrane for water treatment including a SiC layer, manufactured under a sintering condition at 1,300° C. for 1 hour with varying contents of SiC powder. FIGS. 7(a) and (b) show membranes containing 6% by weight of SiC powder in the SiC layer 20, and FIGS. 7(c) and (d) show membranes containing 8% by weight of SiC powder in the SiC layer 20, and FIGS. 7(e) and (f) show membranes containing 10% by weight of SiC powder in the SiC layer 20.

FIGS. 7(a) and (b) show sufficient results for covering the surface roughness of the porous ceramic support layer. In FIGS. 7 (e) and (f), when the SiC powder is 10% by weight or more, cracks are formed as the thickness of the coating layer increases. On the other hand, in FIGS. 7(c) and (d), when the coating layer containing 8% by weight of SiC powder to have a thickness of about 20 μm was formed, it was possible to completely cover the porous ceramic support layer, and as a result, it can be confirmed that a smooth membrane surface was formed without cracks.

As such, the SiC layer formed on the porous ceramic support layer is composed of SiC particles located inside on which the $SiO_2$ oxide layer is formed on the outside thereof, and since the SiC particles are bound to each other by the $SiO_2$ oxide layer and the support layer and the SiC layer are bound to each other, thereby maintaining the connectivity of the opened pores, the durability and water permeance of the membrane excellent. In addition, when the slurry contains about 4% by weight to 10% by weight of SiC powder, the surface roughness of the porous ceramic support layer can be sufficiently covered because the thickness of the SiC layer 20 satisfies the range of 10 μm to 25 μm, and thereby it is possible to prevent cracks from being formed in the SiC layer 20.

Figure 8:
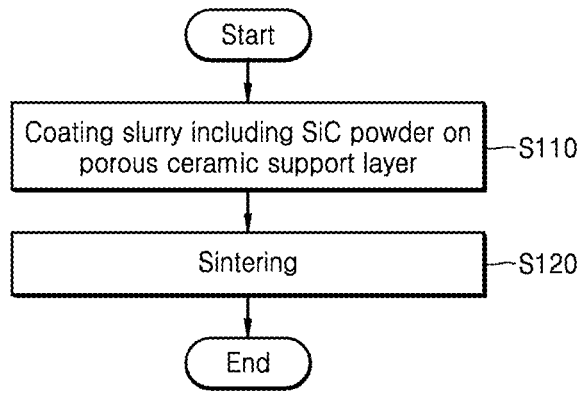
FIG. 8 is a flow chart showing the method for manufacturing a ceramic membrane for water treatment using oxidation-treated SiC according to the present invention.

FIG. 8 is the flow chart showing the method for manufacturing a ceramic membrane for water treatment using oxidation-treated SiC according to the present invention.

Referring to FIG. 8, the method for manufacturing the ceramic membrane for water treatment according to the present invention includes a process S110 of coating a porous ceramic support layer with a slurry including SiC powder and a process S120 of sintering.

Coating a Porous Ceramic Support Layer with a Slurry Including SiC Powder S110

First, the porous ceramic support layer 10 is coated with a slurry including SiC powder.

As previously described, the porous ceramic support layer according to the present invention can be formed of a ceramic including one or more of silicon carbide (SiC), alumina ($Al_2O_3$), titanium dioxide ($TiO_2$), and zirconia ($ZrO_2$). More specifically, a ceramic carbide support layer connected with a glass material made of a ceramic material having gas-permeable pores, a silicon carbide support layer bound with clay, and the like can be used.

The porous ceramic support layer 10 can be manufactured as follows.

A mixture, in which SiC powder having an average particle diameter of 5 μm to 10 μm and a binder are mixed, is aged for 20 hours to 50 hours and then extruded through an extruder. The form of the extruded material can be a parallel-plate form including pores, and it is dried for 10 hours to 30 hours at room temperature. The dried support layer is heat treated at 300° C. to 500° C. for 1 hour to 6 hours in order to remove the binder present inside. Next, it is sintered for 30 minutes to 3 hours at 1,300° C. to 1,500° C.

As a result, the porous ceramic support layer can form interconnected pores having a network structure, which have a porosity of 40% to 60%. The average diameter of the formed pores can be 1 μm to 3 μm.

The slurry including SiC powder contains SiC powder having an average particle diameter of 1 μm or less, distilled water, and an organic solvent.

As previously described, in order to lower the sintering temperature to 1,050° C. or less while the sintering temperature of SiC in the existing bulk state is 1,800° C., SiC powder having an average particle diameter of 1 μm or less can be used. SiC powder with an average particle diameter of 1 μm or less is formed into SiC particles having an average particle diameter of 1 μm or less by being sintered.

Distilled water is mixed with an organic solvent and used for the purpose of diluting the organic solvent.

The organic solvent may include, for example, isopropyl alcohol, polyvinyl alcohol, polyethylene glycol, and the like. Isopropyl alcohol suppresses bubbles generated while mixing slurry so as to produce a uniform SiC layer. In addition, after coating, isopropyl alcohol increases the drying speed to cause uniform drying.

Polyvinyl alcohol acts as a binder to increase the viscosity of the slurry to control the movement of SiC particles, and in particular, it serves to prevent SiC particles from entering through the pores inside the support layer 10 by capillary force.

In addition, when the ratio of polyvinyl alcohol to polyethylene glycol satisfies the mixing ratio of 1:1 to 1:2, the micro strength of the sintered SiC layer 20 can be further improved.

With respect to 100% by weight of slurry, 4% by weight to 10% by weight of SiC powder, 50% by weight to 70% by weight of distilled water, and 25% by weight to 40% by weight of an organic solvent can be included. In addition, a dispersant can be further added at 1% by weight or less with respect to 100% by weight of the slurry, but it is not limited thereto.

The coating can be carried out by dip coating, sol-gel coating, or aerosol-spray coating.

As previously described, the slurry including 4% by weight to 10% by weight of SiC powder is applied on the porous ceramic support layer in the form of a thin film of 10 μm to 25 μm, and a SiC layer 20 having a thickness of 10 μm to 25 μm can be formed. Although the thickness of the coating layer can be formed to a maximum of 30 μm, it is desirable to form at 10 μm to 25 μm in terms of the physical properties and reliability of the SiC layer 20.

When the thickness of the SiC layer 20 satisfies the range of 10 μm to 25 μm, the surface roughness of the porous ceramic support layer can be sufficiently covered, and it is possible to prevent cracks from being formed in the SiC layer 20.

Sintering S120

Next, the coated result is sintered at 950° C. to 1,050° C. to form a $SiO_2$ oxide layer on the surface of SiC particles. Sintering can be carried out under an oxidizing environment or atmospheric environment.

When the sintering temperature is less than 950° C., binding between the SiC powders is insufficient, the growth rate of the $SiO_2$ oxide layer formed on the surface of SiC particles is inadequate, and interconnected pores may not be sufficiently formed. Conversely, when the temperature exceeds 1,050° C., the number of interconnected pores formed while sintering at 950° C. to 1,050° C. decreases, the number of independent pores (closed cell) in a closed structure in which all of the walls are closed increases so that the water permeance of the SiC layer decreases markedly.

As such, sintering is carried out at 950° C. to 1,050° C. to promote the growth of the $SiO_2$ oxide layer and maintain interconnected pores.

Figure 9:
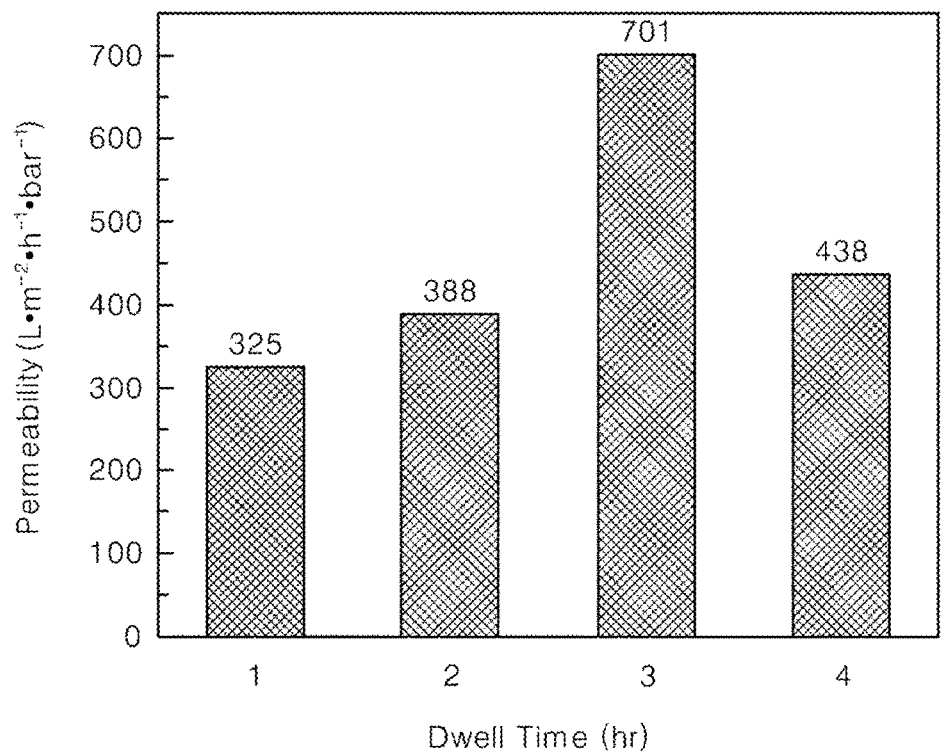
FIG. 9 is a graph showing the water permeance vs sintering time of a SiC layer according to the present invention.

Furthermore, sintering is preferably carried out at about 1,000° C. for 2 hours to 4 hours, more preferably for 2.5 hours to 3.5 hours. Referring to FIG. 9, when the sintering time is less than 2 hours, the growth rate of the $SiO_2$ oxide layer formed on the surface of SiC particles is inadequate, it can be difficult to sufficiently form the interconnected pores, and there is a problem of lowered water permeance. Conversely, when the sintering time exceeds 4 hours, it exhibits a SiC oxidation percentage similar to the case of sintering for less than 2 hours, and the water permeance of SiC layer decreases to 438 $L \cdot m^{-2} \cdot h^{-1} \cdot bar^{-1}$ or less.

Therefore, since the SiC layer satisfies the sintering retention time of 2 hours to 4 hours, excellent water permeance of 400 $L \cdot m^{-2} \cdot h^{-1} \cdot bar^{-1}$ or greater can be exhibited.

The SiC layer 20 by sintering according to the present invention includes pores whose average diameter is 0.05 μm to 0.5 μm, which is smaller than the average diameter of pores included in the porous ceramic support layer 10.

As such, in the present invention, a slurry containing SiC powder is applied on the porous ceramic support layer 20 followed by sintering under an oxygen or atmospheric environment to oxidize and bind the surfaces of the SiC particles at the same time, and manufactures the ceramic membrane for water treatment.

Generally, when sintering the coating layer formed of particles on the sintered support layer all at once, the binding between the particles occurring during the sintering process generates a contraction of the coating layer, and in severe cases, defects can be generated between the support layer and the coating layer.

On the other hand, the present invention can prevent defects due to the contraction of the coating layer by triggering volume expansion using the $SiO_2$ oxide layer which is formed during the oxidation of SiC and binds SiC so that a ceramic membrane for water treatment with excellent durability can be manufactured.

Moreover, SiC powder with an average particle diameter of 1 μm or less, compared with SiC in the bulk state, has very high sensitivity for a sintering environment, the oxygen supply during sintering under an oxidizing environment is smooth, and thus the reaction rate is improved compared with SiC in the existing bulk state.

As such, specific embodiments of the ceramic membrane for water treatment using oxidation-treated SiC and a method for manufacturing the same are as follows.

1. Manufacture of Ceramic Membrane for Water Treatment and Evaluation Results of Physical Properties Thereof Manufacture of Porous Ceramic Support Layer First, 92% by weight of SiC powder having an average particle diameter of 6.7 μm was mixed with 8% by weight of clay having an average particle diameter of 2.1 μm. 0.2 part by weight of methyl cellulose based on 100 parts by weight of the raw material powder was added as an extruder binder for extrusion of parallel-plate support layers. 0.3 part by weight of distilled water based on 100 parts by weight of the raw material powder was added to form a mixture. The mixture was aged for 48 hours and then extruded through an extruder (KTE-50S, Kosentech, Korea).

Figure 10:
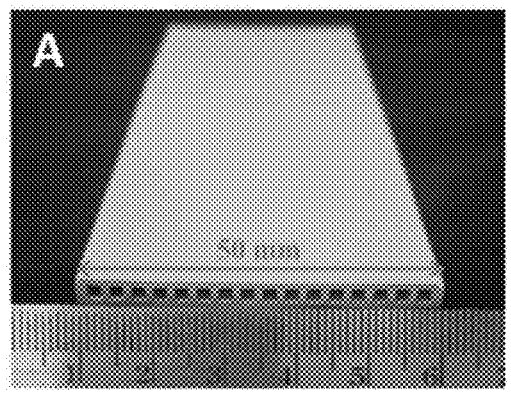
FIG. 10 shows (a) the form and (b) the microstructure of a sintered clay-bound SiC parallel-plate support layer after extrusion according to the present invention.
Figure 10:
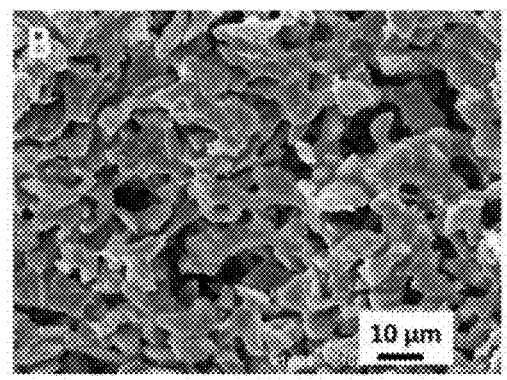

The form of the extruded material is, as shown in FIG. 10, a parallel plate. More specifically, it is in the form of a width of 50 mm, a height of 4 mm, and a length of 20 cm, and 16 holes (2 mm in width and height, respectively) are formed inside.

The extruded material was dried at room temperature for 24 hours and heat treated at 400° C. for 4 hours to remove the binder present therein. Afterwards, by sintering at 1400° C. for 1 hour, a porous ceramic support layer was prepared.

The bending strength of the prepared porous ceramic support layer was 46 MPa±2.74%.

As shown in FIG. 10(b), it can be seen that the microstructure of the porous ceramic support has a well-developed network structure of coarse pores. Here, the porosity was 47%, and the average diameter of the formed pores was 1.8 μm. Pure water was used to measure the water permeance of the porous ceramic support layer, and it was found that the porous ceramic support layer had a high water permeance of 5.5×10³ $L \cdot m^{-2} \cdot h^{-1} \cdot bar^{-1}$.

Manufacture of SiC Layer

A SiC layer was formed on the previously prepared porous ceramic support layer using dip coating.

First, a slurry was prepared by mixing 8% by weight of SiC powder, 59% by weight of purified water, 30% by weight of isopropyl alcohol (Samchun Chemicals, Korea), 1% by weight of polyvinyl alcohol, 1% by weight of polyethylene glycol, and 1% by weight of Darvan-CN as a dispersant based on 100% by weight of the slurry.

The SiC powder (F 15-A, specific surface area of 15 m²/g, H. C. Starck Ceramics GmbH, Germany) has an average particle diameter of 0.55 μm.

The dip coating was carried out under conditions of a dipping time of 30 seconds and a withdrawal speed of 1 mm/s, and after dip coating, drying was carried out at room temperature for 24 hours. The dried product was sintered at a temperature in the range of 900° C. to 1,300° C. at a heating rate of 3° C./min for 1 hour to 4 hours. The thickness of the prepared SiC layer is 20 μm.

Breaking strength was measured using the four-point bending-strength test method (Instron 4206 testing system).

In order to measure the microstructure for the evaluation of pore properties, a scanning electron microscope (JSM-5800, JEOL, Japan) was used, and the pore size distribution was measured by the mercury impregnation method (mercury porosimeter, Autopore IV 9510 System, Micromeritics, USA). In addition, the water permeance property of the parallel-plate ceramic membrane for water treatment was evaluated by utilizing a water permeance evaluation device (MTS2000, Sam Bo Scientific, Korea).

Figure 11:
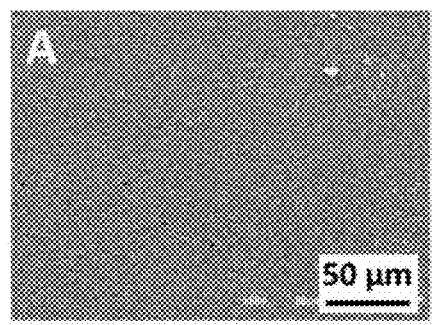
FIG. 11 is a cross-sectional diagram illustrating the microstructure in which a SiC layer is formed on the SiC parallel-plate support layer according to the present invention.
Figure 11:
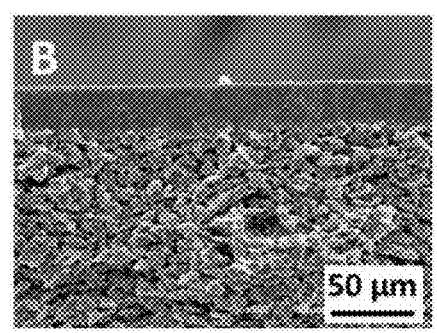

FIG. 11 is a cross-sectional diagram illustrating the microstructure in which a SiC layer is formed on the SiC parallel-plate support layer according to the present invention. It can be confirmed that the surface is constantly flat, defects such as cracks were not found, and SiC particles did not enter the inside of the support layer.

As such, a coating structure free of defects was due to the fact that SiC powder having an average particle diameter of 1 μm or less included in the slurry was mixed with an organic solvent such as isopropyl alcohol and polyvinyl alcohol at an appropriate mixing ratio.

The oxidation process of SiC shows a mostly passive oxidation behavior. The passive oxidation behavior increases the weight and volume of the SiC layer due to the growth of amorphous $SiO_2$ particles formed on the surface of SiC particles during oxidation. In particular, under an oxidizing environment, changes in the sintering temperature and sintering time have important influences on the formation of $SiO_2$ by oxidation, an increase in the resulting weight, and the like.

Figure 12:
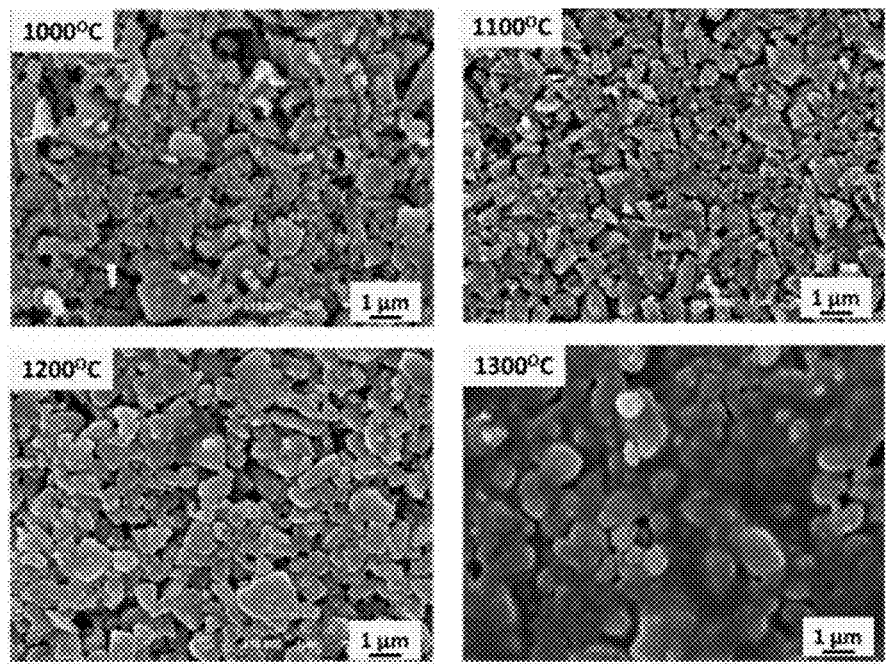
FIG. 12 illustrates the microstructure of the SiC layer according to the present invention when the temperature is changed for the SiC layer for 1 hour.

FIG. 12 illustrates the microstructure of the SiC layer according to the present invention when the temperature was changed for the SiC layer for 1 hour. Referring to FIG. 12, there was no change in the microstructure due to oxidation at 900° C., but it was observed that as the sintering temperature increased from 1,000° C. to 1,300° C., the surface microstructure by oxidation was changed. That is, at a high sintering temperature of 1,000° C. or greater, it could be observed that the formation of $SiO_2$ was promoted on the surface of SiC particles.

Figure 13:
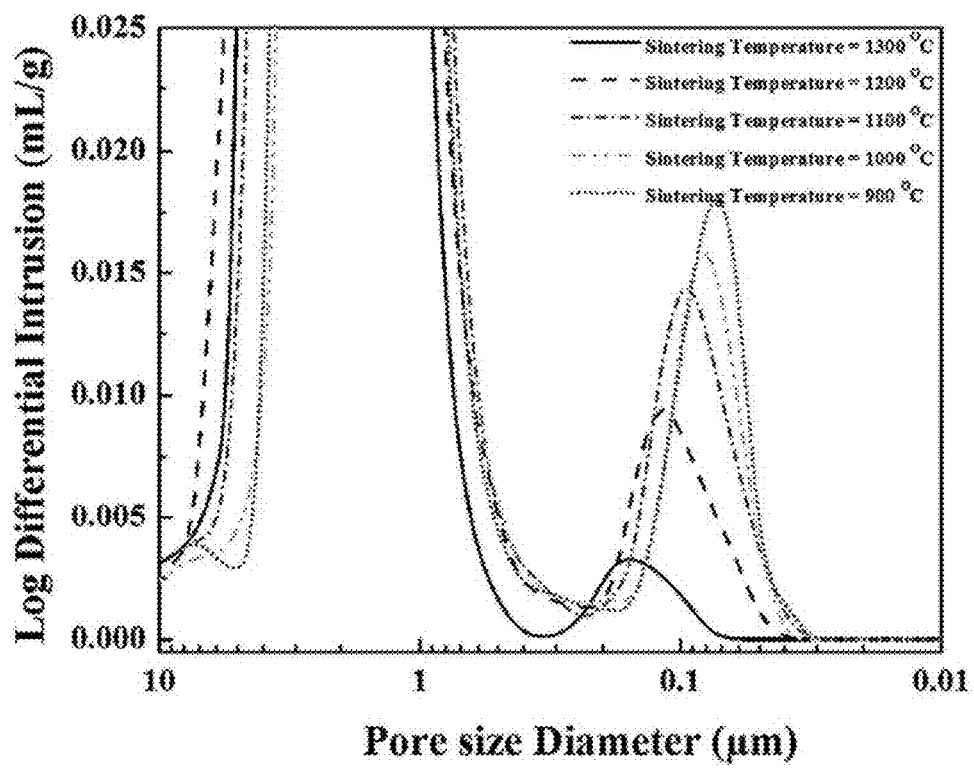
FIG. 13 is the result showing the pore size distribution of the SiC layer according to the present invention determined by utilizing a mercury impregnation process.

FIG. 13 is the result showing the pore size distribution of the SiC layer according to the present invention by utilizing the mercury impregnation process. In FIG. 13, the peak on the left side shows the pore size of the support layer, and the peak on the right side shows the pore size of the SiC layer. The pores of the SiC layer showed a pore size of which the average diameter is about 0.075 µm to 0.155 µm. In particular, as the sintering temperature increases, the pore size increases, indicating a decreasing trend in the height along the y-axis which indicates the degree of mercury impregnation.

This is a phenomenon displayed because the number of open pores decreases and the impregnation amount of mercury decreases as the sintering temperature of the oxidizing environment increases.

Figure 14:
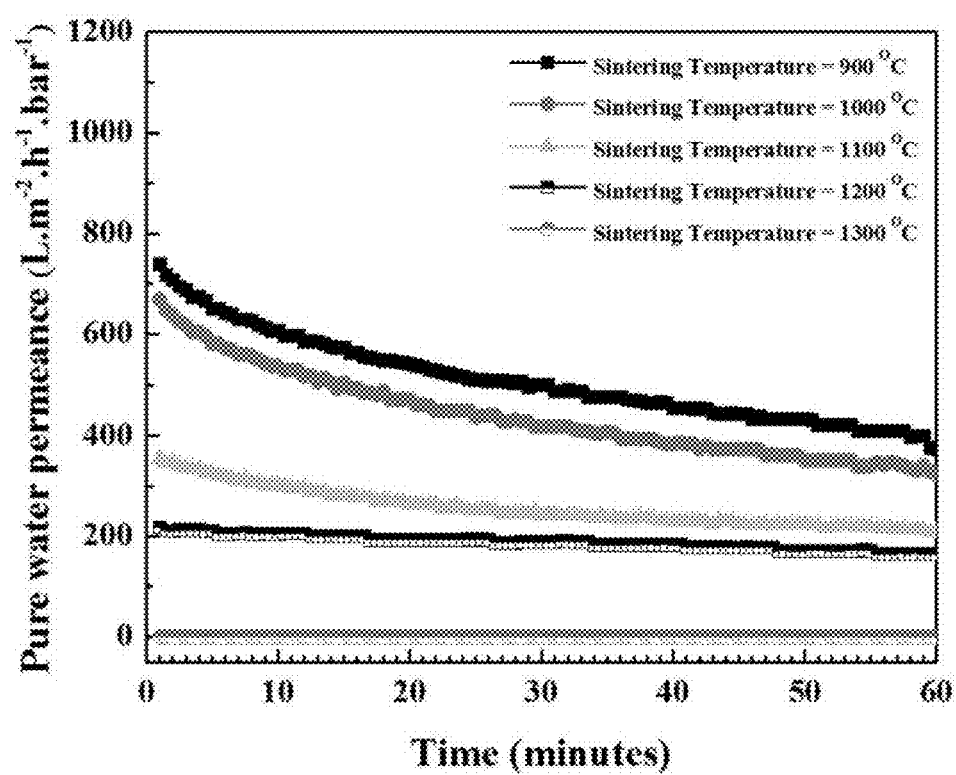
FIG. 14 is the result showing changes in water permeance when the temperature of the SiC layer according to the present invention is changed for 1 hour.

FIG. 14 is the result showing changes in water permeance when the temperature of the SiC layer according to the present invention is changed for 1 hour. Water permeance is calculated via the following equation.

$$J = \frac{f}{S \cdot P}$$

J: Water permeance ($L \cdot m^{-2} \cdot h^{-1} \cdot bar^{-1}$)
f: Flow rate through filter (L/h),
S: Membrane area ($m^2$),
P: Transmembrane pressure (bar)

As observed in FIG. 14, it can be observed that water permeance decreases as the sintering temperature increases.

In general, factors that affect water permeance include the thickness of coating layers, porosity, the size of pores, and the like. In the present invention, as a result of evaluation with SiC layers having the same thickness, water permeance tends to decrease despite an increase in the pore size due to an increase in the sintering temperature. This is determined to be caused by a decrease in the open pore network contributing to air permeability as the connectivity of the previously formed open pores decreases due to an increase in the sintering temperature.

Although a water permeance value of 400 LMH or more is attained at a sintering temperature of 900° C., the mechanical robustness of the SiC layer is reduced due to the low sintering temperature. On the other hand, when the sintering temperature is 1,000° C., an almost similar water permeance value of 325 LMH is attained, but the obtained SiC layer exhibits relatively high mechanical durability. At higher sintering temperatures of 1,100° C. or 1,200° C., a very low water permeance value of 200 LMH to 300 LMH is attained, and at the sintering temperature of 1300° C., the water permeance value is almost zero.

An unusual point is that in general, mechanical durability is inadequate when oxidatively bonding the SiC powder in bulk form at 1,000° C., but the SiC layer according to the present invention exhibits very excellent durability. This is because the SiC layer having a very small thickness has smooth oxygen supply which is the core of the oxidation process as compared to general thick specimens, and thus the oxidation process is carried out very effectively.

Figure 15:
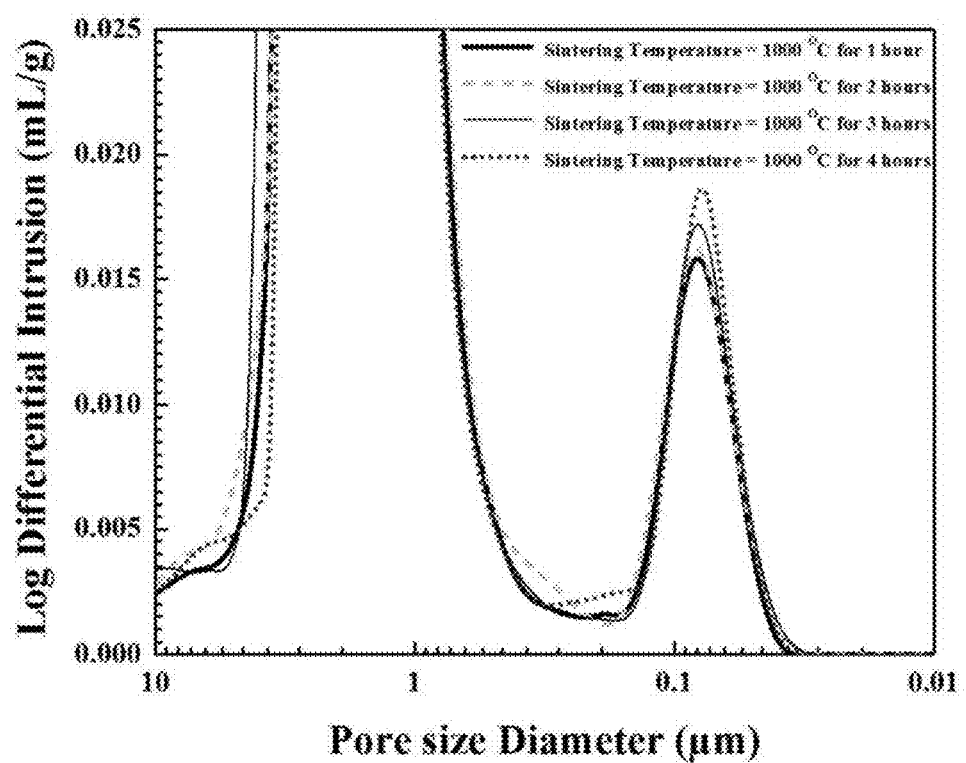
FIG. 15 shows the pore size distribution at various sintering times for the SiC layer according to the present invention at 1,000° C.

As shown in FIG. 15, in the pore size distribution, the pore size does not change as the sintering retention time increases. However, as the sinter retention time increases, the impregnated amount of mercury measured by the mercury impregnation method is increasing, which suggests an increase in water permeance can be expected.

Figure 16:
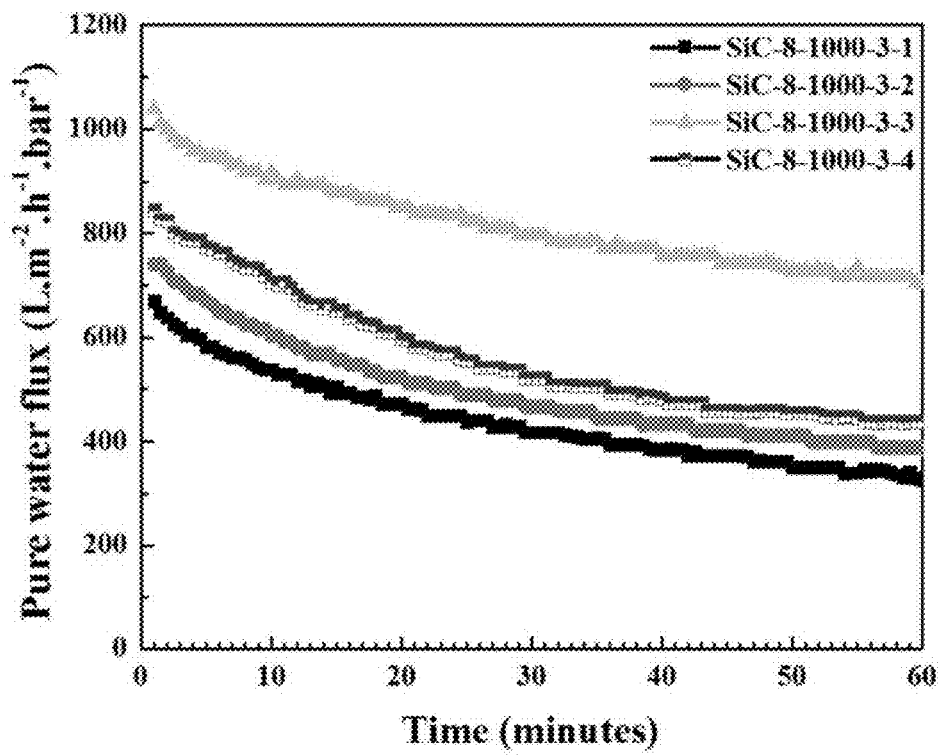
FIG. 16 shows changes in water permeance when the time for sintering the SiC layer according to the present invention at 1,000° C. is changed.

FIG. 16 shows changes in water permeance when the time for sintering the SiC layer according to the present invention at 1,000° C. is changed, and it shows changes in water permeance as the sintering retention time increases in the case of sintering at 1,000° C. Water permeance tends to increase from 325 LMH to 700 LMH as the sintering retention time increases from 1 hour to 3 hours.

However, contrary to this, as the sintering retention time increases to 4 hours, water permeance tends to decrease again. This is a very promising result, and it was found that an increase in the SiC oxidation (percentage) on a basis of the sintering time of 3 hours resulted in a negative influence on water permeance.

This has a degree of oxidation similar to that of sintering at 1,100° C. for 1 hour when the sintering retention time is 4 hours, which is determined to due to a higher degree of oxidation than the optimum degree of oxidation.

That is, in the present invention, it is possible to manufacture excellent ceramic membranes for water treatment by appropriately controlling the sintering temperature and the sintering retention time.

As an additional embodiment, in order to study how the existing reaction sintering structure affects the support body, an alumina support body was coated with silicon carbide, followed by sintering in the same conditions under an oxidizing environment.

Figure 17:
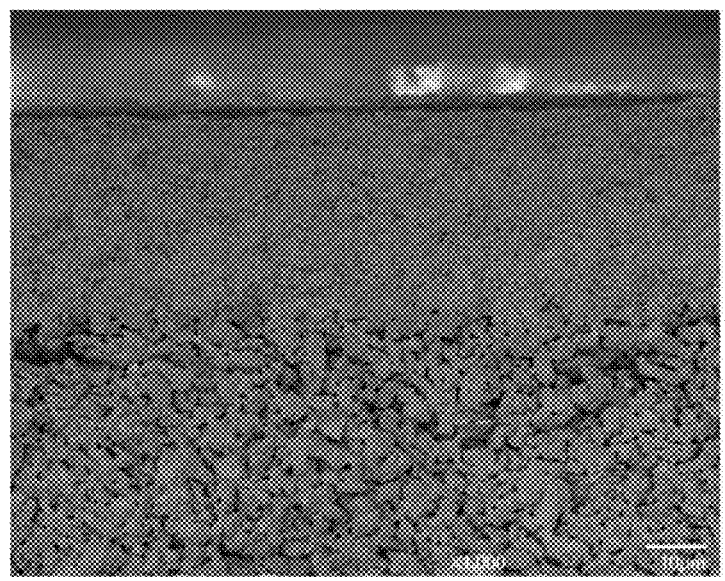
FIG. 17 shows the microstructure of a SiC layer after sintering the SiC layer oxidatively bonded on a porous alumina support layer at 1,000° C. for 3 hours.

FIG. 17 shows the microstructure of a SiC layer after sintering the SiC layer oxidatively bonded on a porous alumina support layer at 1,000° C. for 3 hours. It was possible to obtain an excellent structure of the SiC layer having a thickness of about 30 µm, and since the contraction phenomenon which occurs in the general sintering process does not occur during the oxidation sintering process of the coating layer of SiC, an excellent SiC layer can be obtained, regardless the composition of the support layer.

In addition, it could be confirmed that the robust membrane properties of the SiC layer were unrelated to the support layer. In particular, it was found that it is an experimental result capable of resolving the argument that the clay component having a low melting point in the clay-bonded silicon carbide support layer diffuses toward the SiC layer and can affect the formation of the $SiO_2$ oxide layer.

The ceramic membrane for water treatment according to the present invention is manufactured by forming a coating layer on a porous ceramic support layer using SiC powder followed by heat treatment in an oxidizing environment to form a $SiO_2$ oxide layer on the surface of SiC particles.

The $SiO_2$ oxide layer is formed by sintering SiC powder at a temperature of 1,050° C. or lower, and by utilizing such a low binding temperature, the sintering temperature of SiC in the existing bulk state, which is 1,800° C. or higher, is lowered to a temperature of 1,050° C. or lower, and, as a result, economically feasible membranes can be manufactured.

In addition, a $SiO_2$ oxide layer formed, during sintering, on the surface of SiC particles does not contain impurities, and thus, it has an advantage of being very chemically stable.

Moreover, ceramic membranes including oxidation-treated SiC are expected to have excellent application effects as a water treatment filter.

Although the embodiments of the present invention have been described above with reference to the accompanying drawings, the present invention is not limited to the embodiment and can be manufactured in a variety of different forms, and a person having ordinary skill in the technical field to which the present invention belongs may understand that it may be carried out in other concrete forms without changing the technical spirit and essential features of the present invention. It is therefore to be understood that the above-described embodiments are illustrative in all aspects and not restrictive.

DESCRIPTION OF REFERENCE NUMERALS

10: Porous ceramic support layer
20: SiC layer

What is claimed is:

1. A ceramic membrane for water treatment, comprising:
a porous ceramic support layer; and
a SiC layer formed on the porous ceramic support layer,
wherein the SiC layer comprises SiC particles and a $SiO_2$ oxide layer formed on a surface of the SiC particles,
wherein the SiC particles have a SiC oxidation percentage in a range of 12% to 15%, and
wherein the $SiO_2$ oxide layer has a thickness in a range of 0.028 μm to 0.035 μm.

2. The ceramic membrane according to claim 1, wherein the SiC particles have an average particle diameter of 1 μm or less.

3. The ceramic membrane according to claim 1, wherein the SiC layer contains pores having an average diameter in a range of 0.05 μm to 0.5 μm.

4. The ceramic membrane according to claim 1, wherein the SiC layer is in a form of a film having a thickness in a range of 10 μm to 25 μm.

5. A method of manufacturing a ceramic membrane for water treatment, comprising:
  (a) coating a porous ceramic support layer with a slurry comprising SiC powder; and
  (b) sintering the coated result at a temperature of 950° C. to 1,050° C.,
wherein a $SiO_2$ oxide layer is formed on a surface of SiC particles by the sintering,
wherein the SiC particles have a SiC oxidation percentage in a range of 12% to 15%,
wherein the $SiO_2$ oxide layer has a thickness in a range of 0.028 μm to 0.035 μm; and
wherein the sintering is carried out for 2.5 hours to 3.5 hours.

6. The method according to claim 5, wherein the SiC particles have an average particle diameter of 1 μm or less.

7. The method according to claim 5, wherein, in step (b), a SiC layer contains pores having an average pore size in a range of 0.05 μm to 0.5 μm.

8. The method according to claim 5, wherein, in step (b), a SiC layer has a thickness in a range of 10 μm to 25 μm.

* * * * *